May 29, 1956  E. F. ROSENBLATT  2,747,970
PURIFICATION OF COMMERCIAL HYDROGEN
Filed Oct. 16, 1951
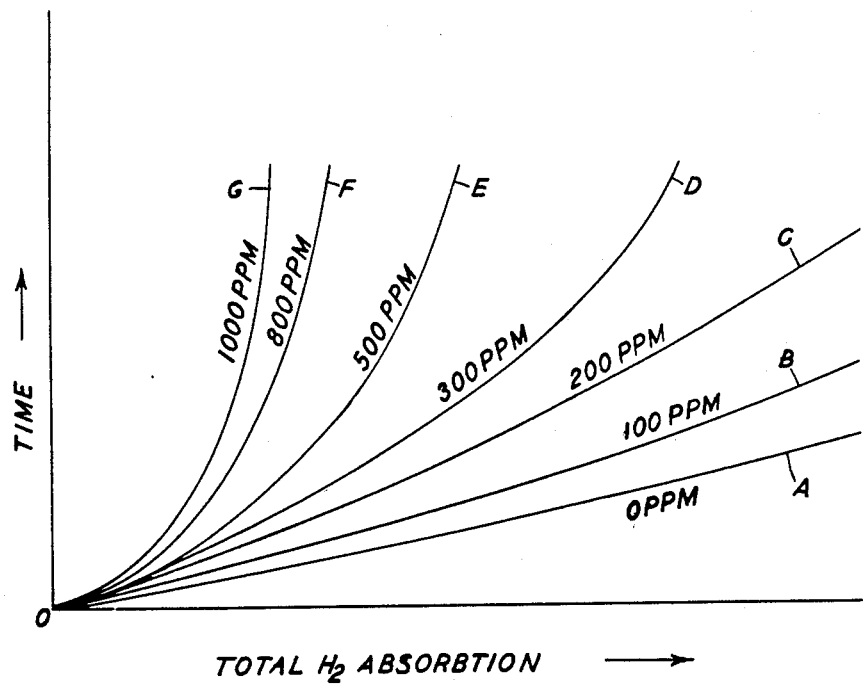
INVENTOR.
EDGAR F. ROSENBLATT
BY Karl Huber
ATTORNEY.

United States Patent Office 2,747,970
Patented May 29, 1956

2,747,970

PURIFICATION OF COMMERCIAL HYDROGEN

Edgar F. Rosenblatt, Montclair, N. J., assignor to Baker & Co., Inc., Newark, N. J., a corporation of New Jersey Application October 16, 1951, Serial No. 251,517

3 Claims. (Cl. 23—210)

This invention relates generally to the use of commercially produced hydrogen in hydrogenation processes, and is more particularly concerned with removing the CO and $CO_2$ contamination found in commercially supplied hydrogen.

Many industrial processes that involve reduction by hydrogen are adversely affected by the presence of impurities in the hydrogen. Electrolytic hydrogen (i. e. hydrogen obtained as a by-product in the production of caustic soda by the electrolysis of salt solution), is known to be completely free of traces of CO or $CO_2$. However, the cost of shipping hydrogen and other economic factors prohibit its use at great distances from the factory and as a result many localities are forced to rely on hydrogen produced by other methods. Large quantities of hydrogen may be made for example from "water gas" (i. e. a mixture of hydrogen and carbon monoxide produced by passing steam through red-hot carbon), by passing the "water gas" and steam over a catalyst such as oxides of iron, chromium, and thorium. However, this reaction may not always be complete (as is the case where for example the reaction takes the form of $CO+H_2O=H_2+CO_2$), and although most of the carbon dioxide is removed from the product by dissolving it in water under pressure, the remaining hydrogen still has traces of carbon monoxide therein and some CO.

Hydrogenation of organic compounds with catalysts formed of nickel, cobalt, iron, copper, zinc, chromium, palladium or platinum, or oxides and mixtures thereof, etc. is an important industrial process which is adversely affected by the CO impurity in commercial hydrogen. The catalysts used in this process consist of metal on carriers, in powder, granular or pelleted form, and it has been found that where the catalysts and the material to be reduced are derived from the same batches, inconsistent results are obtained in successive hydrogenation cycles due to the traces of CO in the hydrogen.

Some commercially produced hydrogen in supply tanks has been found to have as much as 300 parts per million of CO and others about 100 parts per million of CO. The presence of such small amounts of CO in the hydrogen tends to decrease the formation of atomic hydrogen and adsorption thereof onto the hydrogenation catalyst. The hydrogenation catalyst, which activates the hydrogen by adsorbing the molecular hydrogen and forming atomic hydrogen is thus "poisoned" or made less active, and it consequently becomes necessary to frequently stop the process to replace or reactivate the catalyst.

It is a general object of the invention to provide a method for removing traces of carbon monoxide and carbon dioxide from hydrogen. It is a further object to provide a process for treating commercial hydrogen so that it may be used in the catalytic hydrogenation of organic compounds without causing the catalyst to become "poisoned."

Further objects and advantages of this invention will become apparent from the following description, reference being had to the accompanying drawing, which depicts graphically the results of catalyst poisoning.

The presence of a special catalyst such as ruthenium and rhodium has been found to enable the conversion of the traces of CO and $CO_2$ into methane gas and thus the treated commercial hydrogen has been found to be completely satisfactory for hydrogenation purposes and is comparable to hydrogenation employing electrolytically produced hydrogen.

For example, the presence of carbon monoxide in hydrogen is readily determined by the decline of the rate of absorption of the hydrogen into the compound being reduced. This rate may be determined by measuring after successive time intervals, the amount of hydrogen that is absorbed in a reaction chamber containing the organic compound to be reduced.

In the drawing referring to the hydrogenation of 4 ml. $C_6H_5NO_2$ (nitrobenzene) dissolved in 100 ml. $CH_3COOH$ (glacial acetic acid) at atmospheric pressure with 200 mg. 5% Pd on $Al_2O_3$ powder, curves A to G are shown as representing the rates of hydrogen absorption for varying concentrations of CO from 0 to 1000 p. p. m. The curve A shows a straight line relationship in the case of electrolytic hydrogen, i. e. where no CO is present, and indicates that the absorption per unit time of hydrogen stays unchanged during the time required for complete hydrogenation. Where a small amount of CO is present, as for example 100 p. p. m. (curve B) the rate of absorption decreases and this rate progressively decreases more and more as the presence of CO increases (see curves B to G). Where CO is present in about 300 p. p. m. a substantial decrease in the rate at which hydrogen is absorbed occurs; and when the CO content increases to about 1000 p. p. m. hydrogenation ceases to occur after a relatively short time (curve G). The curves shown represent the hydrogenation wherein a conventional catalyst is used, e. g. 5% Pd on alumina. It can thus easily be seen how serious even a very small CO content will affect hydrogenations which run over periods of several hours, since the amount of hydrogen absorbed continues to drop as long as the hydrogenation continues.

It becomes apparent therefore that the unwanted CO must be converted or removed.

It has been found that hydrogen containing 300 p. p. m. of CO was markedly improved by passing it over a Pd-alumina catalyst. However, on prolonger use the hydrogen again becomes poisoned and even the use of a temperature of 115° C. with this catalyst does not remove all the CO. Higher concentrations of CO (e. g. 5000 p. p. m.) could not be removed even when temperatures as high as 260° C. were used. Furthermore, the Pd catalyst itself exhibits a marked deterioration with use, and its limitation to a fairly narrow CO range makes its use quite unsuitable.

The use of Pt-alumina catalysts produces results which are even more unsatisfactory than those produced by the Pd-alumina catalyst. For example it would require a temperature of 285° C. to remove even small amounts of CO (100 p. p. m.); and larger amounts (i. e. 5000 p. p. m.) cannot be removed at all. Such results are also found to occur with the use of an iridium catalyst with temperatures up to 285° C.

In all the previously known catalysts used to purify commercial hydrogen for use in the hydrogenation of organic compounds it has been found that the catalyst itself becomes progressively less active as the treatment time increases.

According to my invention I propose the use of a ruthenium or rhodium catalyst preferably supported on a carrier of any water insoluble, dehydrated earth metal oxide e. g. chromium oxide, zirconium dioxide, aluminum oxide or alumina, etc. over which the hydrogen gas will be passed to remove the CO by converting same to hydrocarbons such as methane for example. The approximate relations for the conversion to methane of traces of CO and $CO_2$ or methanization reaction per se is well known and is indicated by the following equations for reactions occurring in the gas phase:

I. $CO + 3H_2 \rightarrow CH_4 + H_2O + 51,300$ cals.
II. $CO_2 + 4H_2 \rightarrow CH_4 + 2H_2O + 41,000$ cals.

The main objective in these reactions is the maximum formation of the normally gaseous hydrocarbon methane in order to remove all traces of CO or $CO_2$ which may be present in the hydrogen. Furthermore, the generation of the methane gas will not interfere with the activity of the hydrogenation catalyst itself.

The following examples set forth certain well defined instances of the application of the method of this invention. They are, however, not to be considered as limitations thereof, since changes may be resorted to without departing from the spirit and scope of this invention.

*Example 1*

A commercial hydrogen containing between 0.03% to 0.04% CO was flowed over 38 gm. of 0.5% Ru on 1/8" $Al_2O_3$ pellets at a rate of 75 liters per hour at a reaction temperature of 120° C. The CO content was completely removed.

*Example 2*

An electrolytic hydrogen with about 4% CO added was flowed over about 110 gm. of 0.5% Ru on 1/8" $Al_2O_3$ pellets at a rate of 520 liters per hour and at a reaction temperature of 400° C. The CO content was 98% removed.

*Example 3*

An electrolytic hydrogen containing between 0.1% and 0.16% of CO and 0.23% $O_2$ was flowed over 20 gm. of 0.5% Ru on 1/8" alumina pellets at a rate of 75 liters per hour and at a reaction temperature of 190° C. The CO content as well as the $O_2$ was completely removed.

*Example 4*

An electrolytic hydrogen with about 4% $CO_2$ added was flowed over about 110 gm. of 0.5% Ru on alumina pellets at a rate of 520 liters per hour and at a reaction temperature of 400° C. The $CO_2$ content was completely removed.

*Example 5*

An electrolytic hydrogen with about 4% $CO_2$ added was flowed over about 110 gm. of 0.5% Rh on alumina pellets at a rate of 520 liters per hour and at a reaction temperature of 410° C. The $CO_2$ content was completely removed.

*Example 6*

An electrolytic hydrogen containing 4% of CO was flowed over about 110 gm. of 0.5% Rh on alumina pellets at a rate of 520 liters per hour and at a reaction temperature of 420° C. The conversion of CO was 99% complete. However, the catalyst could not be re-used unless reactivated by heating in hydrogen at 550° C.

The most suitable catalyst for the CO removal is Ru which can be re-used indefinitely in the absence of contaminants. Rhodium is equally effective except when used for larger concentrations of CO, when it requires a reactivation. In the removal of $CO_2$ the Rh catalyst can be re-used.

The amount of catalyst required for complete removal is seen to depend upon the CO or $CO_2$ concentration in $H_2$ and on the temperature at which one wishes to carry out the reaction. According to formula I the upper concentration limit for CO in $H_2$ is 25% by volume or generally in gaseous mixtures containing CO and $H_2$ the ratio is 3:1. Thus I have experimentally found that as much as 27% CO in $H_2$ can be 94% removed at a flow of 41 liters per hour and a reaction temperature of 280° C. However, the amount of 0.5% Ru on alumina pellets required was undetermined.

The preferred catalyst to be used would be from 0.1% to 0.5% Ru on activated alumina or other carrier. However, for purifying $H_2$ or $H_2$ containing gases from small amounts of CO and/or $CO_2$ a catalyst of Rh or Ru can be used within a range of from 0.01% to 2.0%.

From the above description it will be seen that I have provided a simple and improved process for removing small amounts of carbon monoxide from hydrogen gas and that this process is especially useful for treating hydrogen prior to its use in the hydrogenation of organic compounds. Without further description it is thought that the features and advantages of this invention will be readily apparent to those skilled in the art, and it will of course be understood that minor changes may be resorted to without departing from the spirit of the invention as set forth in the appended claims.

What I claim is:

1. In the process of removing CO and $CO_2$ present in commercially prepared hydrogen gas, the step consisting of directly contacting said hydrogen gas containing said CO and $CO_2$ with a supported catalyst consisting of from 0.01% to 2.0% of a metal selected from the group consisting of ruthenium and rhodium on a support of an activated earth metal oxide, and maintaining said contact at a reaction temperature of at least 120° C. until the carbon content of the CO and $CO_2$ is substantially completely converted to methane over said catalyst.

2. The process of claim 1 wherein the contact catalyst consists of from 0.1% to 0.5% Ru on a carrier of activated alumina.

3. In the process of removing CO and $CO_2$ present in commercially prepared hydrogen gas, the step consisting of directly contacting said hydrogen gas containing said CO and $CO_2$ with a supported catalyst consisting of from 0.1% to 0.5% of a metal selected from the group consisting of ruthenium and rhodium on a support of an activated earth metal oxide, and maintaining said contact at a reaction temperature of at least 120° C. until the carbon content of the CO and $CO_2$ is substantially completely converted to methane over said catalyst.

References Cited in the file of this patent

UNITED STATES PATENTS

| | | |
|---|---|---|
| 2,487,981 | Reed | Nov. 15, 1949 |
| 2,535,060 | Gresham | Dec. 26, 1950 |
| 2,567,596 | Clark | Sept. 11, 1951 |

OTHER REFERENCES

Storch et al.: "The Fischer-Tropsch and Related Syntheses," pages 309–311, publ. by John Wiley and Sons, N. Y. C. 1951.